United States Patent [19]
Dvorak

[11] 4,111,562
[45] Sep. 5, 1978

[54] HYDRAULIC GIMBAL SYSTEM FOR BEAM PROJECTION LAMPS

[75] Inventor: Antonin J. Dvorak, Richmond Heights, Ohio

[73] Assignee: General Electric Company, Schenectady, N.Y.

[21] Appl. No.: 587,603

[22] Filed: Jun. 17, 1975

[51] Int. Cl.$^2$ ............... G01N 21/16; G01J 1/00
[52] U.S. Cl. ................................ 356/244; 74/5.4; 74/5.6 R; 356/121
[58] Field of Search ............... 356/121, 122, 244; 74/5.4, 5.6 R, 5.7, 5.42

[56] References Cited
U.S. PATENT DOCUMENTS
2,880,557  4/1959  Todd et al. ................. 356/121

OTHER PUBLICATIONS
An Instrument for Automatically Recording Isocandela Diagrams of Beamed Light Sources, W. Bahler, Philips Technical Review, vol. 23, No. 8/9, pp. 278–292, 1961/1962.

Primary Examiner—Vincent P. McGraw
Attorney, Agent, or Firm—Paul F. Wille; Lawrence R. Kempton; Frank L. Neuhauser

[57] ABSTRACT

A gimbal system is disclosed in which low static friction hydraulic motors drive two concentric movable rings in orthogonal planes. For each ring, the drive shaft of the motor is part of one supporting axle. The other supporting axle is coupled to a shaft position encoder. The motor is mounted so that only rotational motion is imparted to the ring, and the encoder is mounted so that only rotational motion is read out.

10 Claims, 9 Drawing Figures

HYDRAULIC GIMBAL SYSTEM FOR BEAM PROJECTION LAMPS

CROSS-REFERENCE TO RELATED APPLICATION

This application relates to application Ser. No. 587,602 now U.S. Pat. No. 3,972,626, Edward L. Laskowski, filed concurrently herewith and assigned to the assignee of the present invention.

BACKGROUND OF THE INVENTION

This invention relates to a positioning mechanism for beam projection lamps and, in particular, relates to a hydraulically controlled gimbal mount structure for precisely positioning the projected beam.

In the prior art, a wide variety of beam-positioning or movable lamp-mounting means have been proposed. A difficulty with all known prior art systems is the impreciseness with which the beam is positioned. While for application purposes this may not be critical, precise beam positioning is very important in testing the lamps, particularly in the automotive area where lamps must comply with specified beam patterns.

A second difficulty with prior art systems is that beam-positioning accuracy, if obtained, is gotten only after a considerable amount of time has been expended adjusting the position of the beam. The time required for positioning the beam and the time required for the photometry itself combine to make testing beam projection lamps a time-consuming and tedious process. Typically, the measurements are made manually by positioning the lamp, monitoring the voltage across the lamp, and recording the current from a photocell.

Depending upon the particular test being carried out, this procedure can take as long as one and one-half days for a single lamp. For example, the beam pattern of an automotive headlamp is given by what is known as an isocandle curve, in which a plurality of closed curves indicate the coordinates in space where the illumination is the same. To obtain these curves, the above procedure is repeated for each of a large number of points and the closed curves drawn to include the points.

Another test, involving fewer points but generally requiring one to two hours per lamp to complete, is the test for compliance with the S.A.E. (Society of Automotive Engineers) standards for headlamps. In this test, the beam pattern is checked at 14 locations for maximum or minimum illumination.

In general, it is desired to reduce the time required for these tests and to provide more precise information about the beam pattern. To this end, various systems have been proposed in the past. One such system utilizes a lamp-positioning mechanism controlled by photocell detection circuitry. The circuitry monitors the current generated by a photocell and positions the lamp so that the photocell receives the same level of illumination as the beam is moved. Electric signals indicative of position control the position of a pen in a plotting mechanism to draw the isocandle curves. While faster than the manual procedure, the system is difficult to control. Further, the S.A.E. points are not evaluated except by chance, i.e., the system uses a test variable (position) as a control, which is not preferred.

While the positioning mechanism of the present invention could be used in such a test system, a preferred system utilizes the positioning mechanism of the present invention with the photometry described in the above-noted concurrently filed application, wherein both are under the control of the user and/or a computer.

A variety of positioning mechanisms have been proposed in the prior art, some using gears, others using cables or rigid mechanical linkages to impart motion to the lamp. Typically, these systems read position from the actuating mechanisms for the two axes of rotation rather than from the actuated mechanism. This reduces accuracy since the position reading may not correspond to the actual position due to slack in the mechanism, e.g., backlash in the gears.

One reason separate actuation and readout have been avoided is the high moment of inertia such a system would have, requiring large drive forces and exhibiting momentum problems. Thus, for example, one prior art system uses a "Y" shaped yoke, i.e., a half ring supported at the middle, to impart rotation in the horizontal plane, and a full ring inside, supported across its diameter at the ends of the outer half ring. Since motion in the horizontal plane is defined by the yoke, i.e., the entire support must rotate, the moment of inertia in the horizontal plane is very high. This is a distinct disadvantage in headlamp photometry since the beam pattern being evaluated is extremely rectangular, with the long dimension horizontal. Thus, a large number of horizontal scans are required in which the drive system must act against the high moment of inertia and still provide accurate positioning. (Vertical scanning is not feasible since the number of scans, more particularly the number of turnarounds, becomes very high, greatly increasing the time it takes to complete the isocandle curve.) As with other systems of the prior art, the position data is taken from the actuator rather than from the yoke itself.

Hydraulic control has generally not been considered for the actuating mechanism due to the nature of hydraulic motors available in the prior art. These motors have high "break-away" force, which has been found to result from the type of seal used in the motor. Stated another way, the seals have high static and low dynamic friction, typically requiring 30–40 pounds per square inch (psi) pressure for break-away in small motors. The result is that it is difficult or impossible to precisely control shaft rotation with these motors. This, combined with a separate drive and position readout, would be generally considered to produce a totally unworkable system.

SUMMARY OF THE INVENTION

It is, however, an object of the present invention to provide a hydraulic gimbal system having high positioning accuracy.

It is another object of the present invention to provide a hydraulic gimbal system capable of rapidly moving from one position to another with a predetermined accuracy.

It is a further object of the present invention to provide a gimbal mount system exhibiting smooth starts, stops, and running.

It is another object of the present invention to provide a hydraulic drive system having substantially reduced static friction.

It is a further object of the present invention to provide an improved gimbal mount system wherein position measurements are made independently from the driving mechanism for moving the gimbal.

It is another object of the present invention to provide a precise, hydraulically driven, gimbal mount having reduced moment of inertia.

The foregoing objects are achieved in the present invention wherein there is provided a gimbal mount comprising concentric rings, each ring supported across a diameter thereof and mounted relative to each other on a base so as to enable motion in orthogonal planes. One support for each ring is connected to the output shaft of an improved hydraulic motor, and the other support for each ring is coupled to a shaft position encoder for indicating the relative position of the ring to which it is coupled. The hydraulic motors are supported on coupling plates which allow translational but not rotational motion of the motor, thereby eliminating a source of positioning error. Similarly, each shaft position encoder is coupled to the other support for the ring by an accordian-like flexible shaft coupling which permits translational but not rotational motion. Static friction in the hydraulic motors is reduced by utilizing a two-piece seal which is only very slightly preloaded against the interior wall of the motor but which responds to a pressure differential thereacross by increasing the compressional forces thereon. Moments of inertia are reduced by minimizing moment arm; specifically, by minimizing the distance from center that the drive and sense mechanisms protrude.

BRIEF DESCRIPTION OF THE DRAWINGS

A more complete understanding of the present invention can be obtained by considering the following detailed description in conjunction with the accompanying drawings, in which.

DESCRIPTION OF THE PREFERRED EMBODIMENTS

Figure 1:
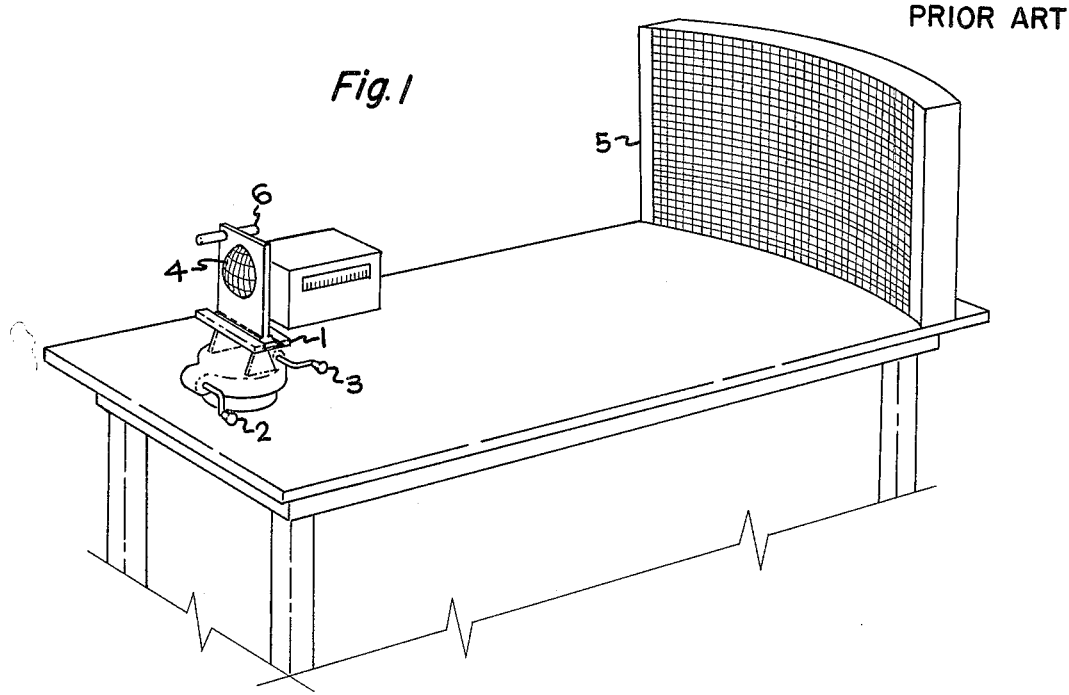
FIG. 1 illustrates a photometry system of the prior art.

FIG. 1 illustrates a photometric system of the prior art in which a manually adjusted headlamp mount is used for positioning the beam pattern from the headlamp under test. Specifically, handles 2 and 3, usually connected to a worm and gear assembly, provide azimuth and elevation adjustments, respectively, of the beam pattern from headlamp 4. The headlamp is positioned by a collimated beam on screen 5 from source 6. The beam pattern is sampled by a photocell (not shown) positioned a predetermined distance from the lamp. This system is difficult to position accurately due to the machine tolerances involved and the backlash in the gearing, and cannot be made automatic due to the position sensing mechanism.

Figure 2:
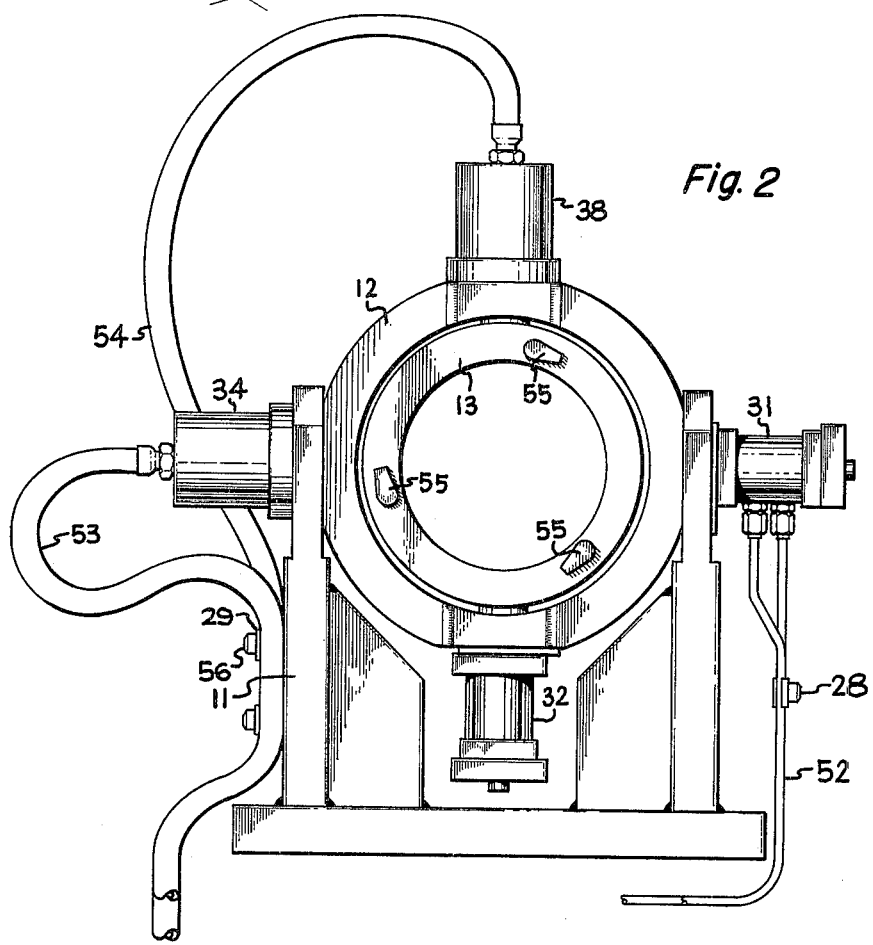
FIG. 2 is a plan view of the hydraulic gimbal in accordance with the present invention.

FIG. 2 illustrates a preferred embodiment of the present invention in which a frame 11 formed by a metal base having uprights welded and braced thereto supports a pair of concentric gimbal rings 12 and 13. Motion of the lamp under test about the vertical axis is controlled by hydraulic motor 32 located on the bottom of the ring 12 and coupled to inner ring 13. The motion about the vertical axis is monitored by encoder 38 which is mounted on the outer ring 12 and connected through a flexible coupling to inner ring 13. Motion about the horizontal axis is provided by hydraulic motor 31 and is monitored by encoder 34.

The hydraulic fluid for driving motor 31 is supplied by hydraulic control circuitry (not shown) which may be conveniently located underneath the base of frame 11. The outputs from encoders 34 and 38 are connected by way of multiconductor shielded cables 54 and 53 to suitable readout mechanisms known per se in the art. In a photometric system utilizing the present invention, the outputs from encoders 34 and 38 are coupled to a digital computer which monitors the horizontal and vertical deflections of the beam.

Incorporated on inner ring 13 are a plurality of fastening members 55 for attaching adapter rings which contain the particular lamp under test. It is understood by those of skill in the art that different types of lamps require different adapter rings. It is preferred that the individual lamps be mounted in an adapter ring such that the optical center of the lamp corresponds to the mechanical center of the gimbal mount structure of the present invention. Thus, the positioning accuracy obtainable from the gimbal is not compromised.

As can be seen by inspection of FIG. 2, separate drive and encoding mechanisms add to the moment of inertia of ring 12 as it is rotated about the axis defined by motor 31 and encoder 34. However, as will be apparent from the detailed description of these elements, the moment of inertia is minimized by utilizing low profile couplings to the inner ring. The desirability for low moment of inertia conflicts with the desirability to have as rigid a structure as possible in that the former favors lighter materials whereas the latter favors heavier construction. Without intending to in any way limit the present invention, this conflict has been resolved in one embodiment of the present invention by utilizing aluminum as the construction material for the rings. For example, utilizing Type 2024 aluminum, the base and supports are 1¼ inches thick and the rings, which in one implementation of the present invention have an inside diameter of 8¼ inches, are 1½ inches thick. Although this may seem massive, rigidity is assured and the gimbal mount of the present invention is extremely accurate.

Figure 3:
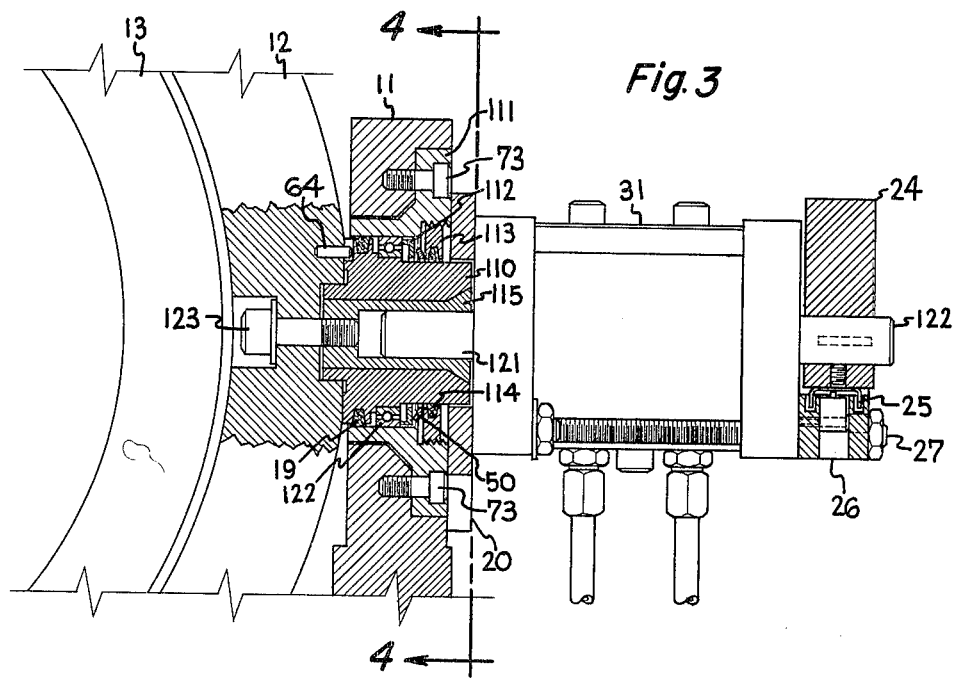
FIG. 3 is a detailed illustration of the hydraulic drive and outer gimbal ring support.

FIG. 3 illustrates in partial cross section the mounting of hydraulic motor 31 to outer ring 12. It is understood that the mounting of hydraulic motor 32 to inner ring 13 is identical. In general, the connection between the gimbal ring and motor must transfer controlling torque without loading the gimbal structure with parasitic forces. To do this, the motor is hung on its shaft and connected to the gimbal ring 12 by a collet-type chuck. Torque moment is transferred from the stator of the motor to a stationary member, in this case frame 11, through a special coupling plate which does not permit rotational motion, since it is coupled to the stationary member, but permits translational motion due to the manner in which the stationary member and stator of the motor are interconnected.

Outer gimbal ring 12 is located relative to frame 11 by way of connecting bolt 123, bearing shaft 110, bearings 122, and bearing housing 111. Bolt 123 actually performs two functions. First, as previously noted, it attaches the bearing assembly to outer ring 12. Secondly, it draws collet 115 down into bearing shaft 110 so that the beveled ends of collet 115 compress about shaft 121 of hydraulic motor 31. Collet 115, in turn, performs two functions. First, as known in the art, a collet provides a precise way of holding a shaft on a center. Secondly, drive shaft 121 of hydraulic motor 31 is frictionally engaged to outer ring 12. This provides a safety function in that, should outer ring 12 be jammed for some reason, the applied torque will exceed the static friction between collet 115 and output shaft 121, permitting shaft 121 to rotate within collet 115. This provides secondary protection for the hydraulic motor. Primary protection is described in connection with FIG. 5.

Bearings 122 are held in place by a ridge on bearing shaft 110 which engages the inner race of bearings 122 and by spacer ring 112, which engages the outer race of bearings 122, and which is held in place by wave spring washer 50 and bearing lock nut 113. Wave spring washer 50 provides a resilient coupling between bearing lock nut 113 and spacer ring 112. This serves to preload the bearing to provide precise alignment of bearing shaft 110 within retaining ring 111. Dust shields 19 and 114 are provided as indicated to seal out foreign matter from the bearings. The dust shields may comprise any suitable material and, in one embodiment of the present invention, comprise a felt ring. Retaining ring 111 is fastened to support 11 by way of cap screws 73.

Figure 4:
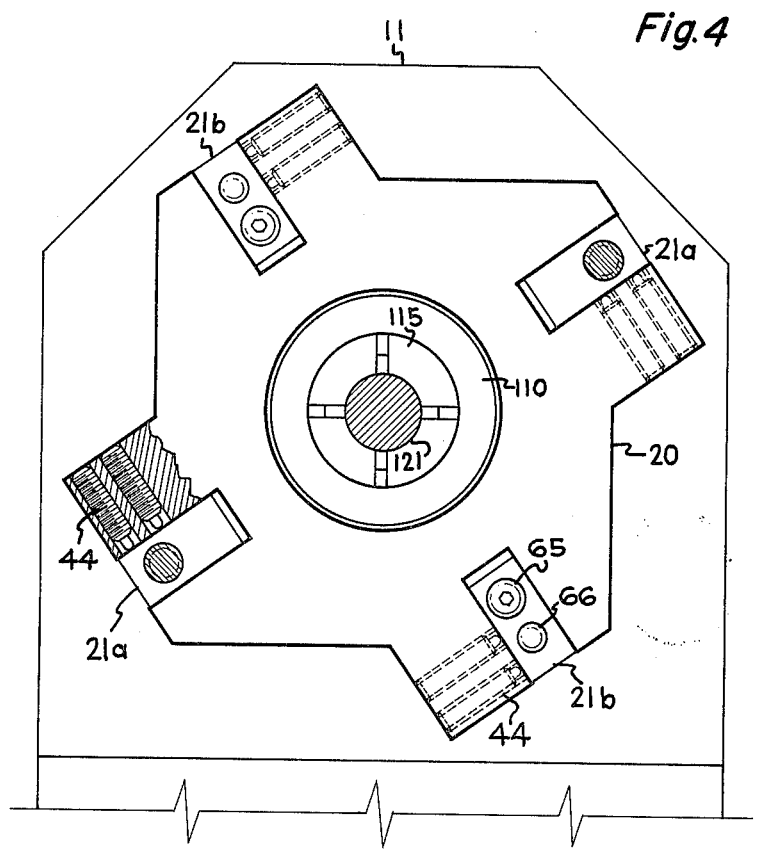
FIG. 4 is a sectional view showing the coupling plate in detail.

Hydraulic motor 31 is attached to frame 11 by way of coupling plate 20 to which it is attached and, in turn, which is attached to bearing housing 111. The construction of coupling plate 20 may be more fully understood by considering FIG. 4 which comprises a plan view of coupling plate 20 illustrating the cross section 4—4 indicated in FIG. 3.

Torque moment coupling plate 20 has four radial slots in the periphery thereof for containing two pairs of keys, labeled 21a and 21b respectively. Keys 21a are attached to the stator of the motor, and keys 21b are attached to bearing housing 111. The central portion of plate 20 comprises an aperture through which bearing shaft 110, collet 115, and output shaft 121 extend, there being adequate clearance between bearing shaft 110 and coupling plate 20 so that the bearing shaft may rotate without contact with the coupling plate. Keys 21a and 21b are preloaded by way of spring plungers 44. As is apparent to those of skill in the art, other forms of preloading may be utilized. Thus, coupling plate 20 allows the motor stator to float slightly, preventing stresses from developing between the motor and frame 11. However, the coupling is completely rigid in rotary action, which provides zero backlash rotary motion.

Figure 5:
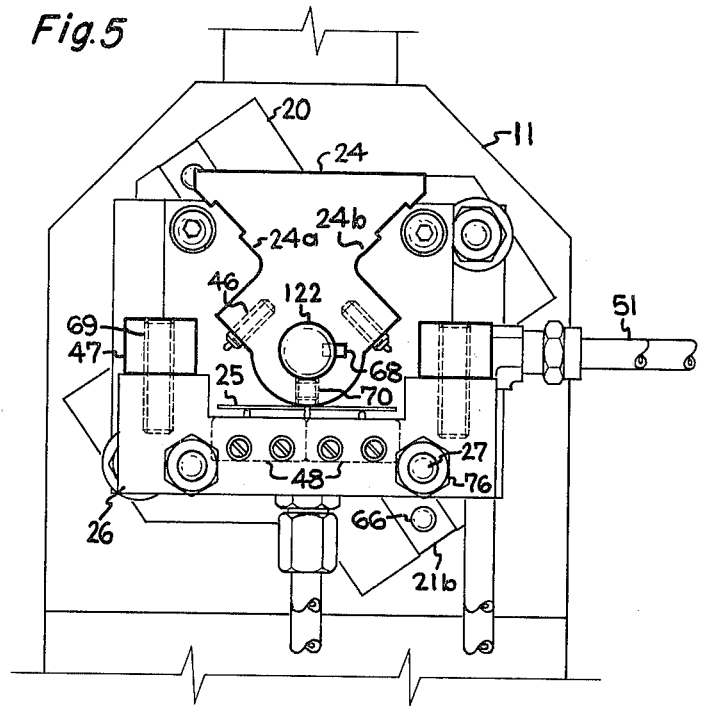
FIG. 5 is an end view illustrating the limit arm and associated hardware.

FIG. 5 illustrates an end view of the hydraulic motor assembly illustrated in FIG. 3, and in particular, illustrates the rotation limiting apparatus utilized with the present invention. While two mechanisms are shown and described, it is understood that either mechanism alone would be sufficient. Further, while the limiting mechanisms shown provide a maximum rotation of approximately ±45° from center, it is understood that the limit may be set at any desired maximum rotation compatible with the particular hydraulic motor utilized.

Rotation is mechanically limited by limit arm 24 which is attached to output shaft 122 of hydraulic motor 31 by way of Woodruff key 68 and set screw 70. Limit block 26, which is fastened to the stator of motor 31 by tie rods 27 and nuts 28, has cushions 47 secured thereto by way of set screws 69. Cushions 47 provide a contact surface for limit arm 24, specifically for contact surfaces 24a and 24b.

Another mechanism for achieving rotational limit is provided by spring plungers 46 which contact rocker arm 25, which in turn is connected to electrical switches 48. Limit switches 48 are connected in the control apparatus for the hydraulic motors to turn off hydraulic motor 31.

Figure 6:
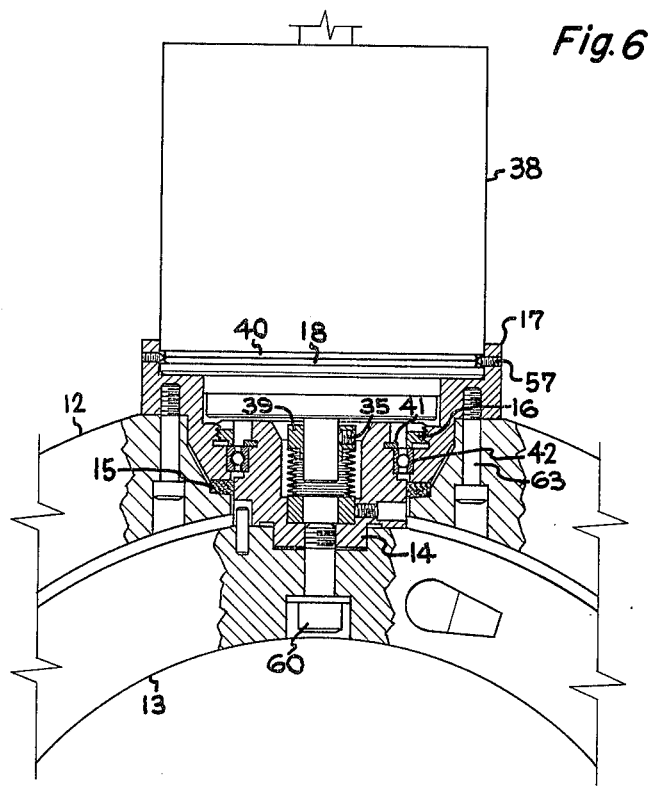
FIG. 6 is a detailed illustration of the encoder mounted on the inner gimbal ring.

FIG. 6 illustrates the mounting of encoder 38 to outer ring 12. Both hydraulic motors and encoders are similarly mounted so as to provide a minimum profile, thereby reducing as much as possible the moment of inertia of the rings. The mounting system for these devices is generally a concentric arrangement of supporting elements such that the drive shaft of the motor or the input shaft to the encoder is mounted as closely as possible to the ring being driven or read out, respectively. In addition, the construction in accordance with the present invention advantageously provides a modular assembly so that the entire coupling unit can be preassembled and fastened to the motor or encoder, which, in turn, is attached to the ring with a single bolt. For example, in FIG. 3, after being attached to motor 34 by way of coupling plate 20, the bearing structure is attached to support 11 by bolts 73 and to outer ring 12 by bolt 123. Similarly, in FIG. 6, with respect to encoder 38, the bearing assembly is attached to outer ring 12 by bolts 63 and to inner ring 13 by a single bolt, bolt 60.

Specifically, the position of inner ring 13 with respect to outer ring 12 is read out by way of shaft encoder 38 which is coupled to inner ring 13 by way of flexible shaft coupling 39. Flexible shaft coupling 39 is connected to the input shaft to encoder 38 and held in place by set screw 35. The other end of flexible shaft coupling 39 is attached by way of a set screw to bearing shaft 14. Interconnecting the end fastening members is accordian- or bellows-like coupling which transmits rotational but not translational motion. Bearing shaft 14 is connected by bolt 60 to inner ring 13.

The structural support for inner ring 13 is provided by ball bearings 42, the inner race of which engages bearing shaft 14 and is held in place by retaining ring 41. The outer race of ball bearings 42 engages bearing housing 17 and is held in place by bearing lock nut 16. A dust shield 15 is also provided to prevent foreign material from entering the ball bearings. The case of encoder 38 is attached to retaining ring 17 by way of set screws 57 which engage a guard ring 18, which, in turn, is set in a groove formed about the circumference of the case of encoder 38.

The bearing assembly in accordance with the present invention thus provides a compact means for mounting either the encoder or the hydraulic motor to the gimbal rings. In the case of the encoder just described, the input shaft to the encoder is coupled to the ring by a flexible shaft coupling which transmits only rotational motion and not translational motion. Thus, the position of the gimbal ring is accurately encoded. The drive shaft of the motor, on the other hand, is directly connected to the gimbal ring and coupled to the support by a coupling plate which allows some translational motion but no rotational motion of the stator of hydraulic motor 31. In this way, the mechanical positioning of the gimbal rings is extremely accurate. Any suitable encoder may be utilized in the present invention; for example, a "Digisec" RA k7/35 encoder provides the necessary accuracy and is suitably compact.

Figure 7:
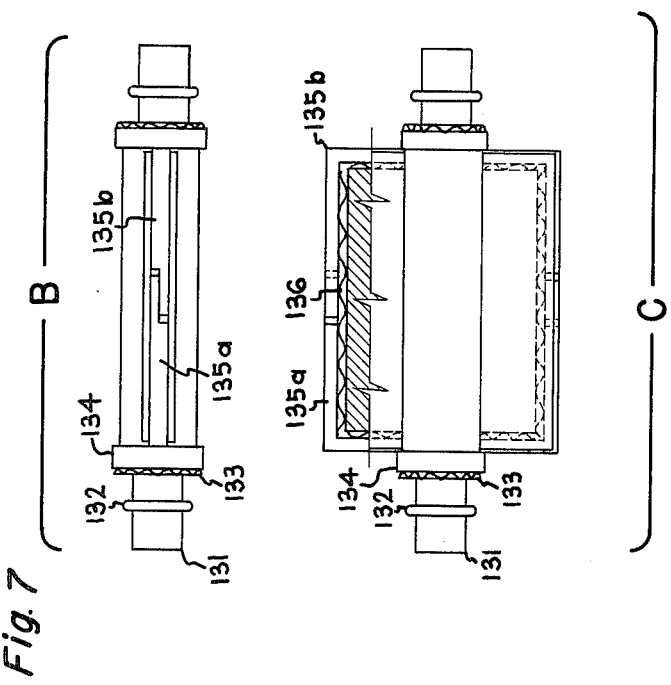
FIGS. 7A—B—C illustrates the rotor and seal assembly for the hydraulic motor.

FIG. 7 illustrates three views of the hydraulic motor, and in particular, illustrates the rotor seal in accordance with the present invention. FIG. 7A is a diagram of a cross section of the hydraulic motor. Specifically, the hydraulic motor contains a rotor 131 having vanes 131a and 131b rotating within a stator 139 which comprises a right circular cylinder having closed ends. Control of the positioning of the rotor is determined by the fluid pressure on either side of each half of the rotor, which, in turn, is determined by the fluid supplied by hydraulic lines 137 and 138. Specifically, if the pressure in hydraulic line 137 is higher than that of hydraulic line 138, then rotor 131 will move in a clockwise direction in an attempt to equalize the pressure on either side of the rotor.

Separating the two chambers on either side of the rotor is seal 135. In the prior art, seal 135 typically comprises a single U-shaped piece of deformable material, e.g., neoprene rubber, compressed in a groove along the contact surfaces between rotor 131 and stator 139. The high compressive loading of the seals of the prior art produced the high break-away forces previously noted.

FIGS. 7B and 7C illustrate a rotor seal in accordance with the present invention in which a split L-shaped seal is utilized. The seal may comprise any suitable material, for example, Teflon. The seal material of the seals in accordance with the present invention are typically harder than those of the prior art since high static compression of the seal material itself is not being relied on. Rather, the compression and sealing functions are separated. In the rotor seal of the present invention, the compressive loading of the seal is obtained from a corrugated or wave spring 136. The compressive loading of seal 135 is not as high as with the prior art seals and the resulting break-away force is considerably lower, typically 5 to 7 pounds per square inch.

Figure 8:
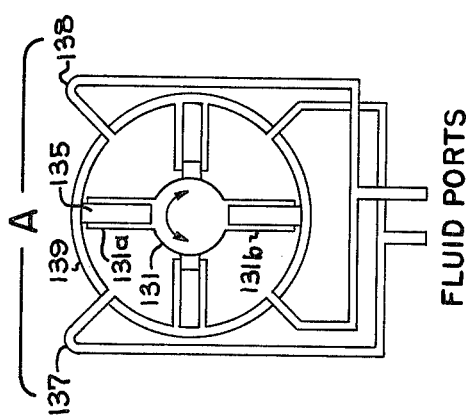
FIG. 8 is a perspective view of half of the rotor seal.
Figure 8:
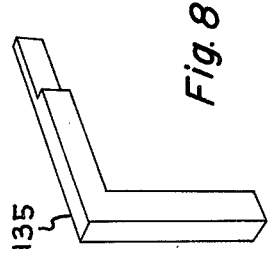

One-half of the seal is illustrated in FIG. 8, two identically shaped pieces making up the entire seal. As can be seen from inspection of FIG. 8, the seal comprises an L-shaped piece having a rabbeted edge for forming a lap joint with a similarly shaped piece to form the complete U-shaped seal. By virtue of the lap joint, the seal can be compressed in three directions without inducing tension in the seal material.

In operation, the compressive force provided by corrugated springs 136 provide only enough force to maintain contact. The majority of the sealing force is supplied by the pressure difference across the seal during operation. Thus, the sealing force, and the seal friction, is roughly proportional to the applied pressure.

Figure 9:
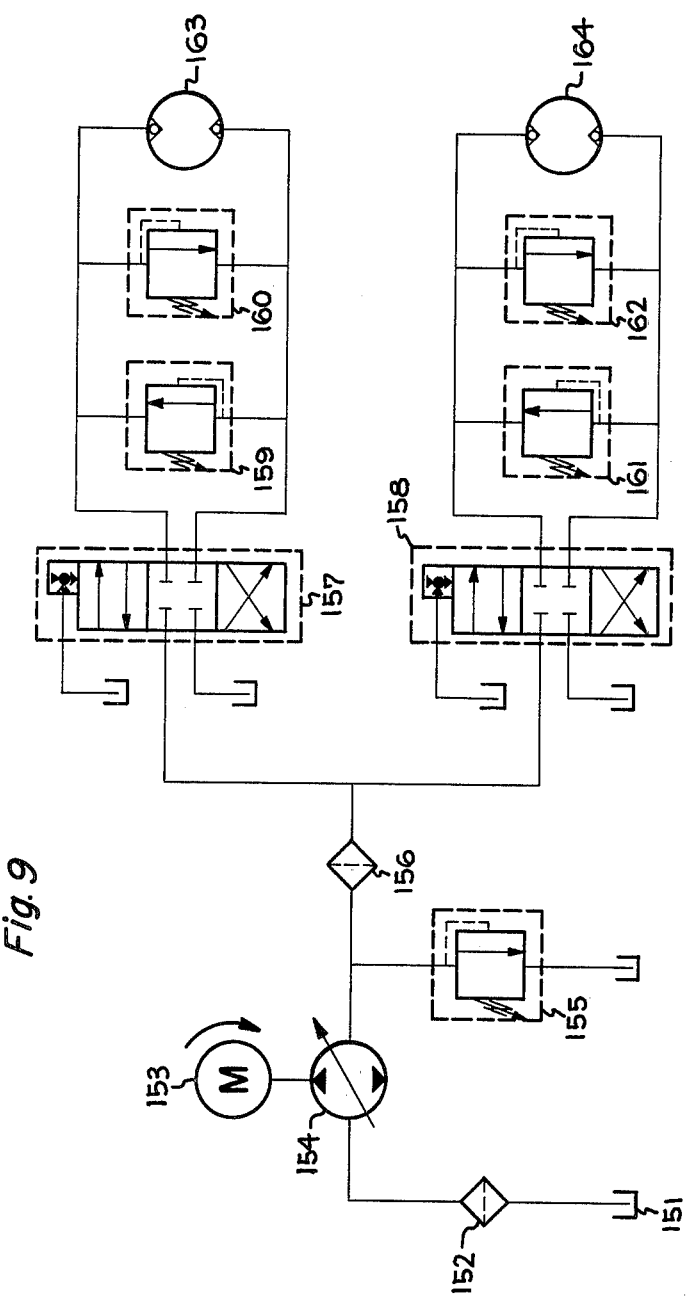
FIG. 9 is a flow diagram of the hydraulic control lines.

FIG. 9 is a hydraulic flow diagram of a suitable hydraulic control circuit for use with the present invention. Specifically, oil from reservoir 151 is taken up through filter 152 and pumped by way of motor 153 and pump 154 through filter 156 to electrohydraulic servo valves 157 and 158. A system pressure relief valve 155 is provided between pump 154 and filter 156 to control the overall pressure of the system. Electrohydraulic servo valves 157 and 158 provide bidirectional oil pressure on the hydraulic lines leading to hydraulic motors 163 dnd 164. Connected in parallel across the hydraulic lines supplying motor 163 are relief valves 159 and 160. These relief valves are oppositely connected and limit the pressure differential supplied to the motor in either direction. These relief valves, combined with the mechanical limit arm illustrated in FIG. 5, protect the hydraulic motors from attempting to exceed their rotational capacity. Hydraulic motor 164 is similarly protected by relief valves 161 and 162. Electrohydraulic servo valves such as Parker Hannifin SVDB-400 and relief valves such as Parker Hannifin 400S4-10 have been found useful in implementing the present invention.

While not part of the present invention, it is preferred that the gimbal mount of the present invention be utilized in a closed feedback loop in which the hydraulic control section for regulating horizontal and vertical motion consists of two electrically operated proportional four-way valves such as those enumerated above. The control loop is formed by the position-sensing encoders, the proportional valves, and a minicomputer. The minicomputer performs as a proportional integral derivative (PID) controller, known per se in the art in hardware form. In this system, the minicomputer directs various modes of operation such as point-to-point motion, continuous scanning, speed control, angular limits, and self-checking of the apparatus. It is understood by those of skill in the art that the PID controller may be implemented either in software or hardware for use in conjunction with the present invention. In connection with the self-checking operation previously noted, the calibration of the present invention is readily accomplished with a laser beam and an optical flat connected by way of an adapter to inner ring 13 of the gimbal mount. It is understood by those of skill in the art that the centering of the gimbal in accordance with the present invention utilizes a floating reference, i.e., the zero reference point is not necessarily represented by a series of zeros from encoders 34 and 38. Rather, it is an arbitrary value from which other readings are made.

There is thus provided by the present invention a new hydraulically controlled gimbal mount having high positioning accuracy, e.g., ±0.01°, rapid scanning, smooth start-stops, low static friction due to the improved seals, and low moment of inertia due to the compactness of the bearing assembly interconnecting the motor or encoder and the gimbal ring. In addition, since the gimbal is smooth running, readings may be taken "on the fly" with no uncertainty of position.

Having thus described the invention, it will be apparent to those of skill in the art that various modifications can be made within the spirit and scope of the present invention. For example, as previously noted, a variety of limiting mechanisms may be incorporated with the gimbal system to prevent damage to the hydraulic motor. Also, while spherical bearings have been shown and described, tapered bearings may also be utilized. Also, while specific examples are given above, it is understood that this is not by way of limitation. For lamps or lamp systems larger than about 8 to 10 inches in diameter, it becomes practical to consider adapting the present invention to yoke-type gimbals. However, if this is done, the headlamp must be mounted, rotated 90° from its normal use orientation, in order to minimize the moment of inertia in the "horizontal" plane (as defined by the lamp optics).

What I claim as new and desire to secure by Letters Patent of the U.S. is:

1. A gimbal mount for beam projection lamps comprising:
   a U-shaped support member;
   a pair of concentric rings;
   a pair of hydraulic drive motors, each having a rotor shaft and a stator;

a pair of shaft position encoders, each having an input rotor and a stator;

first and second coupling means for rotatably attaching the outer ring to said support member across a diameter of said ring;

said first coupling means comprising bearing means having an inner race to which said outer ring and the rotor of one of said hydraulic motors are directly connected and an outer race attached to said support member, the stator of said one hydraulic motor being coupled to said support member;

said second coupling means comprising bearing means having an inner race directly connected to said outer ring and an outer race directly connected to said support member, the input rotor of one of said encoders being coupled to said inner race and the stator of said encoder being directly connected to said support member;

third and fourth coupling means for rotatably attaching the inner ring to said outer ring across a diameter of said inner ring;

said third coupling means comprising bearing means having an inner race to which said inner ring and the rotor of the second of said hydraulic motors are directly connected to an outer race attached to said outer ring, the stator of said second hydraulic motor being coupled to said outer ring; and said fourth coupling means comprising bearing means having an inner race directly connected to said inner ring and an outer race directly connected to said outer ring, the input rotor of the second of said encoders being coupled to said inner race and the stator of said encoder being directly connected to said outer ring.

2. The gimbal mount as set forth in claim 1 wherein said first and third coupling means each comprise:

a bearing shaft fitting inside said inner race, the inside of said bearing shaft being hollow and shaped to receive a collet;

a collet having the base thereof adapted to receive a threaded bolt and the jaws thereof adapted to receive the rotor shaft of one of said hydraulic motors;

an annular retaining ring having an inside diameter portion approximately equal to the outside diameter of said outer race;

preloading means for resiliently preloading said bearing between said bearing shaft and said retaining ring; and threaded fastening means for attaching one of said rings to said fastening means and for causing said collet to tighten about the rotor shaft of one of said hydraulic motors.

3. The gimbal mount as set forth in claim 1 wherein said second and fourth coupling means each comprise:

a bearing shaft fitting inside said inner race, the inside of said bearing shaft being hollow and having internal threads at one end thereof;

a flexible shaft coupling having end fastening means and fitting inside said bearing shaft, one of said end fastening means being attached to the rotor of one of said encoders and the other of said end fastening means being attached to said bearing shaft;

threaded fastening means for attaching one of said rings to said bearing shaft;

an annular retaining ring having an inside diameter portion equal to the outside diameter of said outer race;

preloading means for connecting said outer race to said retaining ring; and attaching means for attaching said encoder stator and said retaining ring to a support.

4. The gimbal mount as set forth in claim 3 wherein said flexible shaft coupling comprises an accordian-shaped flexible member interconnecting said end fastening means.

5. The gimbal mount as set forth in claim 1 wherein said hydraulic motor comprises:

a cylindrical stator having closed ends;

a double-vaned rotor positioned in said stator, each vane having a groove in the three surfaces thereof contacting said stator; and sealing means in said groove for sealing the three contact surfaces of each vane and characterized by a sealing force proportional to the pressure difference across said vane.

6. The gimbal mount as set forth in claim 5 wherein said sealing means comprises:

two rigid L-shaped pieces each having one end thereof shaped to form a lap joint with the other, said joined pieces forming a U-shaped member for sealing said three contact surfaces; and resilient means positioned in said groove underneath said L-shaped pieces for causing said pieces to contact said stator along both ends and the cylindrical surfaces thereof.

7. The gimbal mount as set forth in claim 1 wherein the stator of each hydraulic motor is connected to a support by an assembly comprising:

a plate slightly larger than said stator and having an aperture center and a plurality of radial slots about the periphery thereof;

a plurality of radially movable keys fitted into said slots, each of said keys having an aperture therein for receiving a fastener; and fastening means for attaching some of said keys to said support and the remainder of said keys to said stator.

8. The gimbal mount as set forth in claim 1 wherein the stator of each hydraulic motor is connected to a support by an assembly comprising:

a plate slightly larger than said stator and having a central aperture larger than said bearing shaft, through which said bearing shaft, collet, and rotor shaft may pass freely, said plate also having a plurality of radial slots about the periphery thereof;

a plurality of radially movable keys fitted into said slots, each of said keys having an aperture therein for receiving a fastener; and fastening means for attaching some of said keys to said annular retaining ring and the remainder of said keys to said stator.

9. The gimbal mount as set forth in claim 1 wherein each hydraulic motor comprises:

limit means connected to said rotor shaft for limiting the angular displacement thereof.

10. The gimbal mount as set forth in claim 9 wherein said limit means comprises:

a limit arm connected to said rotor shaft; and a limit block connected to the stator of said hydraulic motor and positioned to intercept said limit arm at predetermined limits of angular displacement.

* * * * *